(12) United States Patent
Rolek (10) Patent No.: US 12,303,045 B1
(45) Date of Patent: *May 20, 2025

(54) DISPLAY CASE DOOR WITH INTERIOR FACING CAMERA

(71) Applicant: Anthony, Inc., Sylmar, CA (US)

(72) Inventor: Matthew Rolek, Valencia, CA (US)

(73) Assignee: Anthony, Inc., Sylmar, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/354,064

(22) Filed: Jul. 18, 2023

Related U.S. Application Data

(63) Continuation of application No. 17/412,728, filed on Aug. 26, 2021, now Pat. No. 11,844,443, which is a
(Continued)

(51) Int. Cl.
*H04N 7/18* (2006.01)
*A47F 3/00* (2006.01)
(Continued)

(52) U.S. Cl.
CPC .............. *A47F 3/002* (2013.01); *A47F 3/005* (2013.01); *E06B 3/36* (2013.01); *E06B 3/6612* (2013.01);
(Continued)

(58) Field of Classification Search
CPC . A47F 3/002; A47F 3/005; E06B 3/36; E06B 3/6612; G01P 13/00; H04N 7/188; H04N 23/54
See application file for complete search history.

(56) References Cited

U.S. PATENT DOCUMENTS

| 5,228,300 A | 7/1993 | Shim |
| 9,860,491 B2 | 1/2018 | Park et al. |

(Continued)

FOREIGN PATENT DOCUMENTS

| CN | 105605879 | 5/2016 |
| CN | 106642981 | 5/2017 |

(Continued)

OTHER PUBLICATIONS

Bonanni et al., "CounterIntelligence: Augmented Reality Kitchen," Proc. CHI, Apr. 2005, 2239, 7 pages.
(Continued)

*Primary Examiner* — Jeffery A Williams
*Assistant Examiner* — Tyler B Edwards
(74) *Attorney, Agent, or Firm* — Fish & Richardson P.C.

(57) ABSTRACT

One broad aspect of the invention features a display case door. The display case door includes a transparent panel assembly, hinges, a camera, and a sensor. The hinges are coupled at a first peripheral edge of the transparent panel assembly. The camera is coupled to the transparent panel proximate to a second peripheral edge of the transparent panel assembly opposite the first peripheral edge. The camera is arranged to capture images of the interior of a display case with the display case door mounted to the display case. The sensor is coupled to the transparent panel assembly, and is in electronic communication with the camera. The sensor is configured to generate a signal that indicates that the display case door is in an open position. The camera is configured to capture an image of the interior of the display case based on the signal generated by the sensor.

20 Claims, 4 Drawing Sheets

Related U.S. Application Data continuation of application No. 16/589,665, filed on Oct. 1, 2019, now Pat. No. 11,141,004.

(60) Provisional application No. 62/740,904, filed on Oct. 3, 2018.

(51) Int. Cl.
*E06B 3/36* (2006.01)
*E06B 3/66* (2006.01)
*G01P 13/00* (2006.01)
*H04N 5/225* (2006.01)
*H04N 23/54* (2023.01)

(52) U.S. Cl.
CPC ............ *G01P 13/00* (2013.01); *H04N 7/188* (2013.01); *H04N 23/54* (2023.01)

(56) References Cited

U.S. PATENT DOCUMENTS

| | | | |
|---|---|---|---|
| 10,528,087 B2 | 1/2020 | Kang et al. | |
| 11,141,004 B1* | 10/2021 | Rolek | H04N 7/188 |
| 11,844,443 B1* | 12/2023 | Rolek | H04N 23/57 |
| 2007/0069908 A1 | 3/2007 | St-Germain | |
| 2011/0005258 A1 | 1/2011 | Audet | |
| 2011/0157357 A1 | 6/2011 | Weisensale et al. | |
| 2011/0292213 A1* | 12/2011 | Lacey | H04N 7/181 |
| | | | 348/154 |
| 2012/0285089 A1 | 11/2012 | Artwohl et al. | |
| 2013/0063326 A1 | 3/2013 | Riegel | |
| 2014/0144083 A1 | 5/2014 | Artwohl et al. | |
| 2015/0223619 A1 | 8/2015 | Artwohl et al. | |
| 2016/0143459 A1 | 5/2016 | Clein | |
| 2016/0201981 A1 | 7/2016 | Kempfle et al. | |
| 2017/0161512 A1 | 6/2017 | Beckman | |
| 2017/0208652 A1 | 7/2017 | Luckhardt et al. | |
| 2018/0011512 A1 | 1/2018 | Cho et al. | |
| 2018/0252463 A1 | 9/2018 | Grimminger et al. | |
| 2018/0365630 A1* | 12/2018 | Seals | H04W 4/35 |
| 2019/0042015 A1 | 2/2019 | Lee et al. | |
| 2019/0050900 A1 | 2/2019 | Avakian | |
| 2019/0122263 A1 | 4/2019 | Avakian | |

FOREIGN PATENT DOCUMENTS

| | | |
|---|---|---|
| CN | 206817873 | 12/2017 |
| CN | 107726703 | 2/2018 |
| CN | 108171885 | 6/2018 |
| DE | 102017221867 | 6/2019 |
| EP | 1030521 | 8/2000 |
| JP | H08-49958 | 2/1996 |
| JP | 3450907 | 9/2003 |
| JP | 2016-023892 | 2/2016 |
| JP | 2016-061556 | 4/2016 |
| JP | 2018-084408 | 5/2018 |
| WO | WO 2017/127035 | 7/2017 |
| WO | WO 2017/151785 | 9/2017 |
| WO | WO 2019/032893 | 2/2019 |

OTHER PUBLICATIONS

Moin, "Smart Refrigerator for Grocery Management," Technical Disclosure Commons, May 6, 2015, 12 pages.

* cited by examiner

DISPLAY CASE DOOR WITH INTERIOR FACING CAMERA

CROSS-REFERENCE TO RELATED APPLICATIONS

This application is a continuation application of and claims priority under 35 U.S.C. § 120 to U.S. application Ser. No. 17/412,728, filed Aug. 26, 2021, which claims priority under 35 U.S.C. § 120 to U.S. application Ser. No. 16/589,665, filed on Oct. 1, 2019, now U.S. Pat. No. 11,141,004, which claims priority under 35 U.S.C. § 119 to U.S. Application Ser. No. 62/740,904, filed on Oct. 3, 2018, and entitled "Display Case Door with Interior Facing Camera," entire contents of which is incorporated by reference herein.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more thermally insulated doors or windows for viewing and accessing refrigerated or frozen objects within a temperature-controlled space. Doors for refrigerated enclosures generally include thermally insulated glass panel assemblies.

Restocking such refrigerated enclosures is generally done from the rear of the enclosure, by a stocking clerk. Real-time monitoring of customer access to such refrigerated enclosures and of the contents of such refrigerated enclosures can be challenging, which often result in refrigerated items failing to be properly stocked. Improvements are sought in monitoring the contents of refrigerated enclosures, monitoring usage of refrigerated enclosures, and managing store inventories.

SUMMARY

One broad aspect of the invention features a display case door with an interior facing camera. The display case door includes a transparent panel assembly, hinges, a camera, and a sensor. The hinges are coupled at a first peripheral edge of the transparent panel assembly. The camera is coupled to the transparent panel proximate to a second peripheral edge of the transparent panel assembly opposite the first peripheral edge. The camera is arranged to capture images of the interior of a display case with the display case door mounted to the display case. The sensor is coupled to the transparent panel assembly, and is in electronic communication with the camera. The sensor is configured to generate a signal that indicates that the display case door is in an open position. The camera is configured to capture an image of the interior of the display case based on the signal generated by the sensor. This and other implementations can each optionally include one or more of the following features.

In some implementations, the display case door includes a door frame extending about and secured to a second peripheral edge of the panel assembly. In some implementations, the camera is coupled to the door frame.

In some implementations, the sensor is an accelerometer.

In some implementations, the sensor is configured to generate a signal upon detecting that the display case door is open by a threshold amount.

In some implementations, the camera is arranged such that at least a majority of shelves contained within the display case are within the field of view of the camera when the door is open by a threshold amount.

In some implementations, the camera is arranged to capture images of the interior of the display case through the transparent panel assembly.

In some implementations, the transparent panel assembly is a vacuum insulated glass assembly.

In some implementations, the transparent panel assembly is a gas filled panel assembly.

Another aspect of the invention features a method of monitoring product inventory. The method includes obtaining, from a sensor mounted on a display case door, a signal indicating that the display case door is in an open position and, in response to the signal, causing a camera mounted on the display case door to capture an image of an interior of a display case to which the display case door is mounted. Other implementations of this aspect include corresponding systems, apparatus, and computer programs, configured to perform the actions of the methods, encoded on computer storage devices. These and other implementations can each optionally include one or more of the following features.

In some implementations, the sensor is an accelerometer.

In some implementations, the sensor is configured to generate the signal upon detecting that the door is open by a threshold amount.

In some implementations, the camera is arranged such that at least a majority of shelves contained within the display case are within the field of view of the camera when the door is open by a threshold amount.

In some implementations, the camera is arranged to capture images of the interior of the display case through a transparent panel assembly of the display case door.

Some implementations include determining door operating metrics based on the signal. In some implementations, door operating metrics include a number of times that the door is open, a frequency at which the door is open, or a time at which the door is open.

Another aspect of the invention features a display case door system that includes a transparent panel assembly, hinges, a camera, a sensor, at least one processor, and a data store. The hinges are coupled at a first peripheral edge of the transparent panel assembly. The camera is coupled to the transparent panel proximate to a second peripheral edge of the transparent panel assembly opposite the first peripheral edge. The camera is arranged to capture images of the interior of a display case with the display case door mounted to the display case. The sensor is coupled to the transparent panel assembly. The at least one processor is in electronic communication with the sensor and the camera. The data store is coupled to the at least one processor. The data store includes instructions stored thereon which, when executed by the at least one processor, cause the processor to perform operations to obtain from the sensor a signal indicating that the display case door is in an open position. The data store also includes instructions stored thereon which, when executed by the at least one processor, cause the processor to perform operations in response to the signal, causing the camera to capture an image of the interior of a display case.

The concepts described herein may provide several advantages. For example, implementations of the invention may provide better ability to monitor customer access and use of display cases. Implementations of the invention may provide better ability to monitor stock of inventory contained within display cases, which may provide increased accuracy in purchasing and maintaining levels of inventory.

Implementations may provide a self-contained inventory management sensor system in a display case door.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
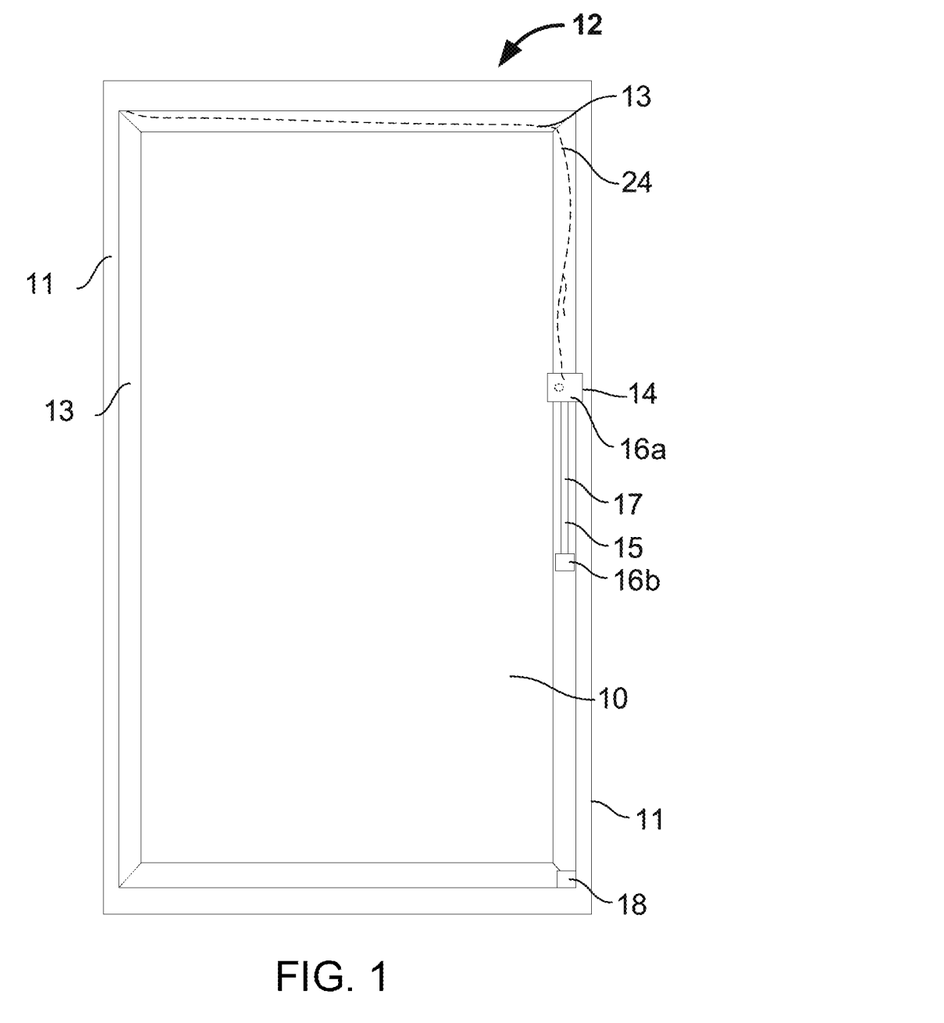
FIG. 1 is a front view of an exemplary display case door.

FIG. 1 illustrates an example implementation of a display case door 12. Display case door 12 includes a transparent panel assembly 10, a door handle 15, and a sensor 18. Transparent panel assembly 10 can include one or more panels of transparent or substantially transparent glass, plastics, or other transparent or substantially transparent materials. Panel assembly 10 can include multiple layers of transparent panes. For example, panel assembly 10 can be a multi-pane unit having two panes separated by a gap, forming a sealed glass unit (SGU). Panel assembly 10 can be a vacuum insulated glass (VIG) assembly. For example, a VIG assembly is an SGU in which the sealed space can be an evacuated space below atmospheric pressure.

Display case door 12 can include a door frame 13 extending about and secured to a peripheral edge of the transparent panel 10. Door frame 13 can include an internal channel (not shown) configured to receive and cover power cables 24 that provide power to camera 14. As further described in FIG. 2, power cable 24 can enter display case door through an aperture or door hinge to connect camera 14 to a power source.

Camera 14 is attached to display case door 12. Camera 14 can be located on the handle 15 or along the portion of frame 13 proximate the handle-side peripheral edge of door 12. In some implementations, camera 14 is attached to an outer surface of handle 15. In other implementations, camera 14 is mounted inside a housing or cavity of handle 15. Camera 14 can be coupled to either of parallel rods 16 or to handle bar 17. In the example implementation shown in FIG. 1, camera 14 is coupled to a top rod 16a of handle 15. Handle 15 can include an aperture (not shown) that is configured to receive a power cable 24 connected to and extending away from the camera to a power source (not shown).

Camera 14 can be oriented to capture images of the interior of a display case 11 when door 12 is in an open position. In some implementations, camera 14 can be positioned to capture images of the interior of display case 11 through the panel assembly 10. Camera 14 can be communicably coupled to an image processing system (not shown) configured to perform object recognition. For example, images captured by camera 14 of the interior of the display case 11 can be sent to the image processing system, and the image processing system can detect the presence of objects contained within the display case. The system can include instructions that when executed by one or more processors of the system causes the system to perform object recognition algorithms on the images captured by the camera. For example, the system can perform algorithms that analyze or authenticate the number and identity of objects contained within the display case using a database of images.

In some implementations, camera 14 can be communicably coupled to an inventory management system. The inventory management system can receive images of the interior of display case 11 captured by camera 14 and use object recognition algorithms on those images captured by camera 14 to determine the identity and/or the quantity of the items contained within the display case. For example, the inventory management system can use the images from the camera to identify out-of-stock and low stock conditions. Based on the images received from camera 14 and object recognition algorithms, the inventory management system can send electronic notifications to store employees regarding out-of-stock or low stock items. For example, upon detecting an out-of-stock condition or a low stock condition, the inventory management system can send an appropriate notification to a user computing device. The notification can be sent in a proprietary format or a general format. A proprietary format notification can include a notification that is sent only to particular user computing devices associated with the store (e.g., Point-of-Sale devices) or to computing accounts associated with a store manager or store owner. A general format notification can include a notification sent in a general format including, but not limited to, an SMS message or an e-mail message. These notifications can include, but are not limited to, information regarding the identity, quantity, and location of the out-of-stock or low stock item.

Sensor 18 is coupled to display case door 12. In the example implementation shown in FIG. 1, sensor 18 is attached to door frame 13 along a first peripheral edge of door 12 proximate to handle 15. In other implementations, sensor 18 is attached to door 12 along a second peripheral edge opposite the first peripheral edge proximate to handle 15. In some implementations, sensor 18 can be coupled to either of the parallel rods 16 or to handle bar 17. In other implementations, sensor 18 can be attached a housing or cavity of the handle. Sensor 18 can include, but is not limited to, a contact switch, an accelerometer, a gyroscope, an ultrasonic sensor, an infrared sensor, or a combination thereof. Sensor 18 can be configured to detect when display case door 12 is in an open position.

Figure 2:
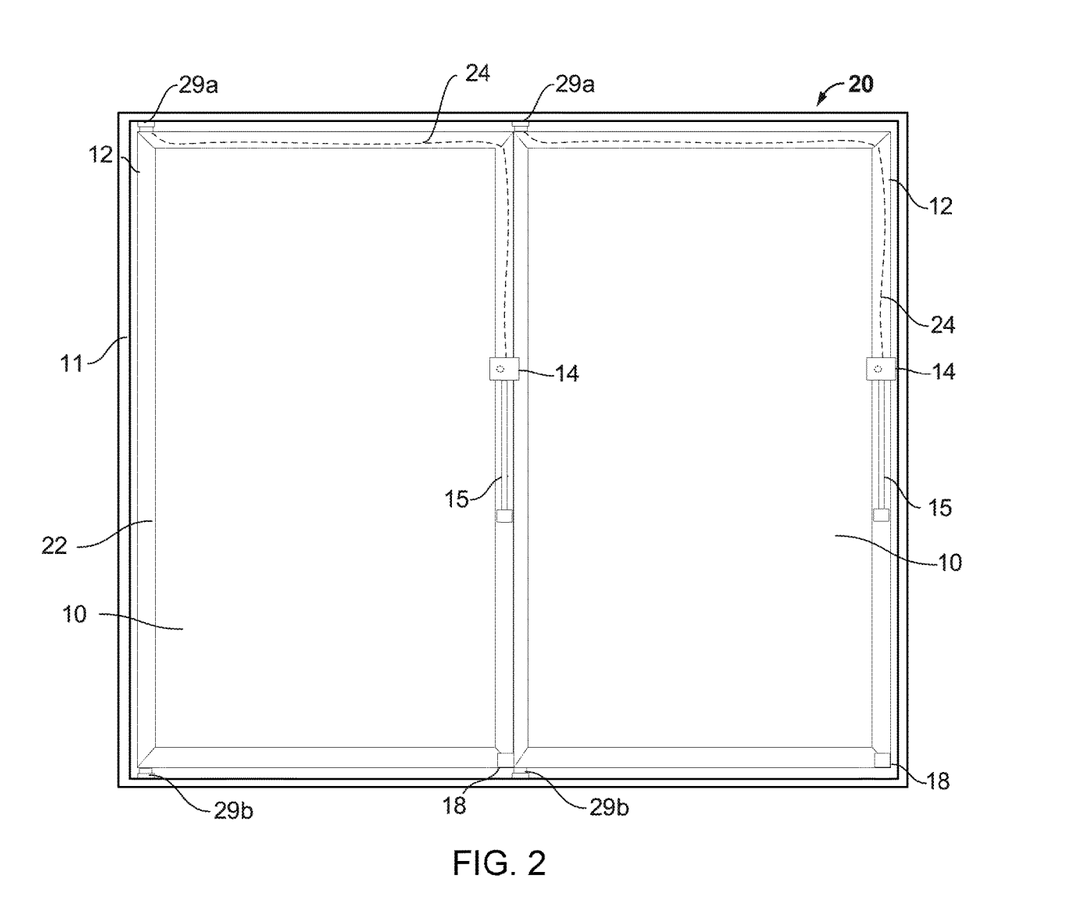
FIG. 2 is a front view of two exemplary display case doors mounted on a display case.

FIG. 2 illustrates an exemplary display case door assembly 20 installed in a refrigerated display case 11. Display case door assembly 20 includes two display case doors 12 pivotally mounted on display case 11 by door hinges 29. The refrigerated display case 11 may be a refrigerator, freezer, or other enclosure defining a temperature-controlled space. For example, refrigerated display case 11 may be a refrigerated display case or refrigerated merchandiser in grocery stores, supermarkets, convenience stores, florist shops, and/or other commercial settings to store and display temperature-sensitive consumer goods (e.g. food products, flowers, and the like). Refrigerated display case 11 can be used to display products that must be stored at relatively low temperatures and can include shelves, glass doors, and/or glass walls to permit viewing of the products supported by the shelves. In some implementations, refrigerated display case 11 is a refrigerated display unit used, for example, in warehouses, restaurants, and lounges. Refrigerated display case 11 can be a free-standing unit or "built-in" unit that forms a part of the building in which the refrigerated display case 11 is located.

The door frame 13 of each display case door 12 can include hinges 29 for pivotally mounting doors 12 on display case 11. Top hinge 29a can be an electrical hinge from which one or more power cables 24 extend. For example, hinge 29a can include an electrical connector (not shown) from which each power cable 24 extends. In some examples, the electrical connector includes a 120V frame plug. In some implementations, bottom hinge 29b can be a gravity hinge and the top hinge 29a an electrical hinge. Door frame 13 can include a hinge rail 22 with top and bottom openings (not shown) that receive hinges 29 (e.g., pin hinges). For example, hinge 29a can be attached to the frame of display case door 12 and inserted into a top opening of hinge rail 22 to attach display case door 12 to display case 11. In some examples, other electrical cables can extend from hinge 29a. For example, panel assembly 10 may include an anti-condensation system that requires power for heating the assembly 10 (e.g., providing power to an electro-conductive coating), in which additional electrical conductors may provide such power. Display case door 12 can be mounted to case 11 using any type of appropriate hinges such as knuckle hinges or ball bearing hinges. In some implementations, doors 12 can be sliding doors configured to open and close by sliding with respect to the case frame.

Figure 3:
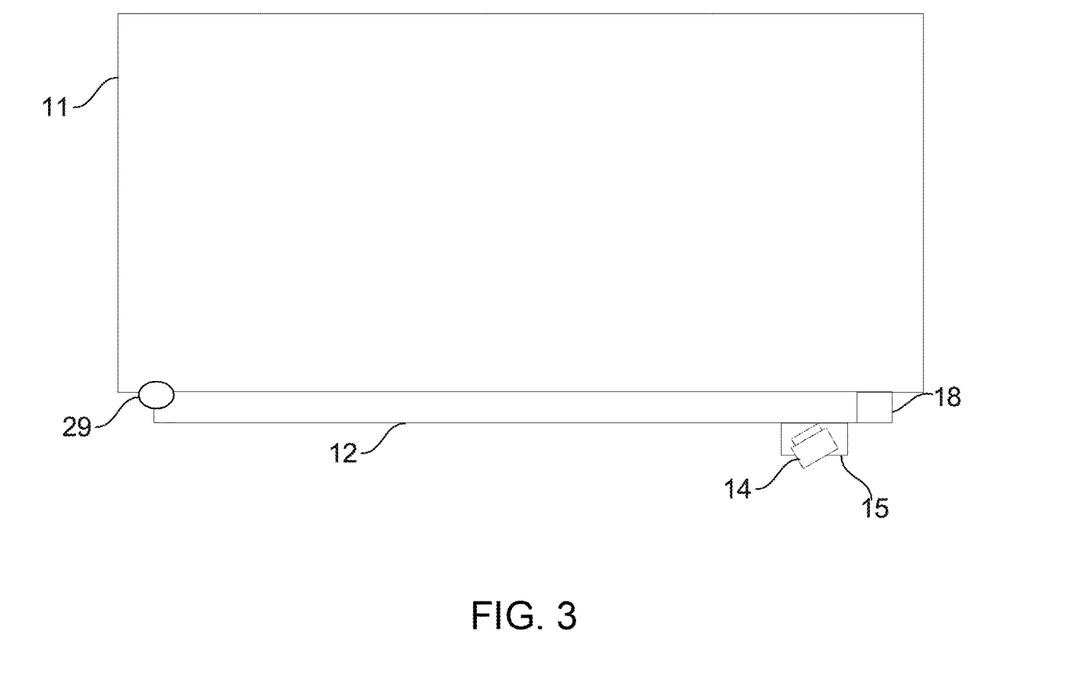
FIG. 3 is a top view of an exemplary display case door in a closed position.
Figure 4:
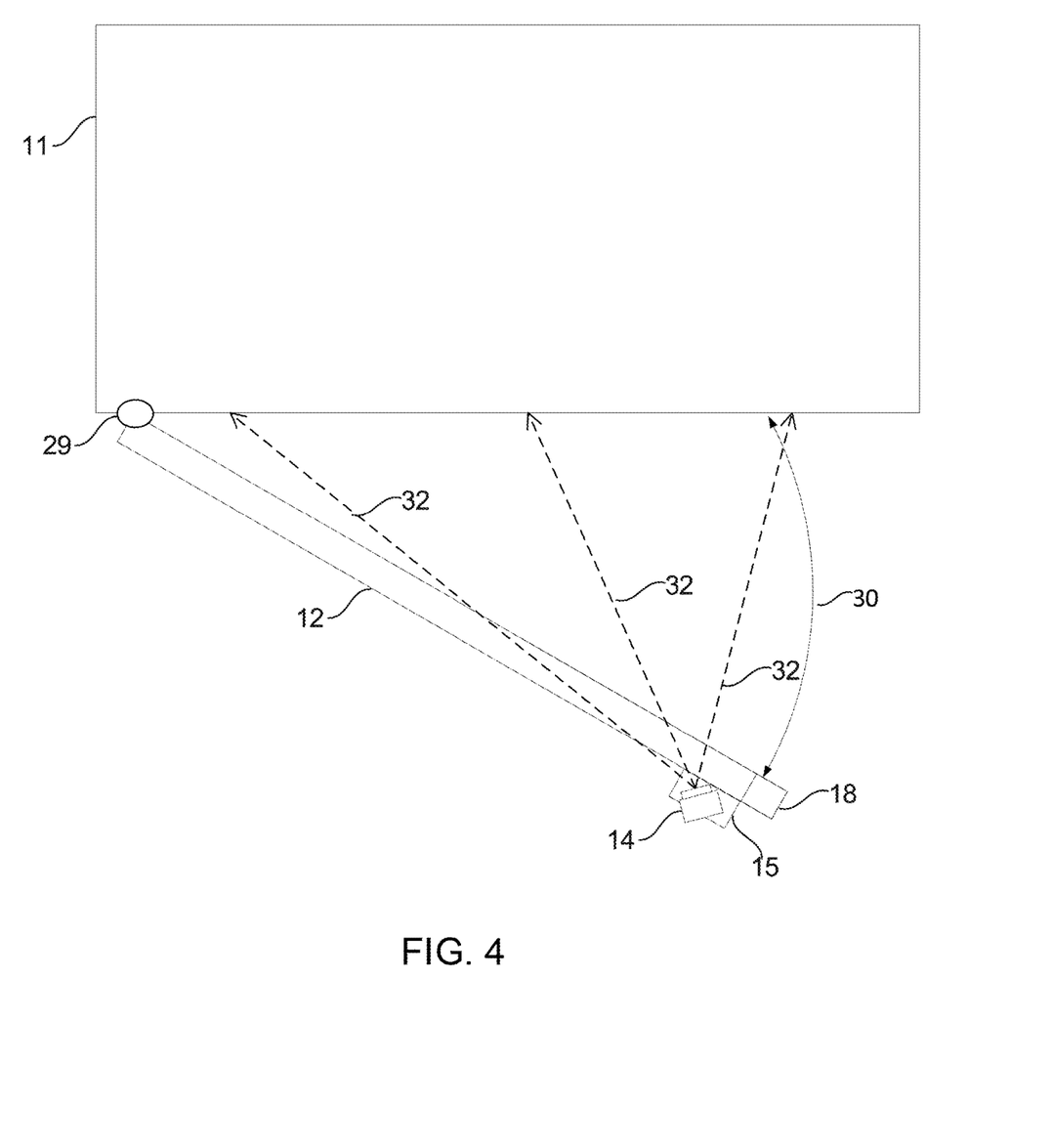
FIG. 4 is a top view of an exemplary display case door in an open position.

FIG. 3 illustrates display case 11 with door 12 in the closed position. FIG. 4 illustrates display case 11 with door 12 in the open position. As shown in FIGS. 3 and 4, display case 11 can be opened by applying force to door handle 15, causing door 12 to pivot about hinge 29. In other implementations, display case 11 can be opened by sliding door 12 with respect to the case frame. Sensor 18 can be configured to detect movement of door 12 from a closed position (as depicted in FIG. 3) to an open position (as depicted in FIG. 4). Sensor 18 can include, but is not limited to, a contact switch, an accelerometer, a gyroscope, an ultrasonic sensor, an infrared sensor, or a combination thereof. In some implementation, sensor 18 generates a signal when door 12 is opened by a threshold amount 30. In some implementations, at least a majority of shelves contained within display case 11 are within the field of view 32 of camera 14 when door 12 is open by threshold amount 30. Sensor 18 can be configured such that sensor 18 will not generate a signal when door 12 is in a closed position. In some implementations, sensor 18 can detect additional conditions, including, but not limited to, light levels, temperature, and humidity levels. Sensor 18 can be configured to share data with media players and/or personal computers through a universal serial bus (USB) connection. In some implementations, sensor 18 is attached to a device that has a wireless Internet connection (i.e. "Wi Fi enabled" device), and can send signals to remote computing devices using the wireless Internet connection.

Sensor 18 can be communicably coupled to camera 14. For example, sensor 18 can transmit a signal to camera 14 to initiate camera 14 to capture images of the interior of display case 11 when sensor 18 detects that display case door 12 is in an open position. Using the output of sensor 18 to synchronize the initiation of camera 14 to capture images provides several advantages. For example, initiating camera 14 to capture images when sensor 18 detects that door 12 has been opened by a threshold amount 30 ensures that at least a majority of the interior of display case 11 is within the camera's field of view 32, which results in improved detection of item identity and quantity when coupled with an image processing or inventory management system. Additionally, using sensor 18 to trigger camera 14 to take images when door 12 is in an open position synchronizes the images captured by camera 14 with events that are likely to result in a change in inventory (e.g. the opening of door 12 by a customer). This synchronization of images with inventory-changing events allows for improved efficiency in inventory management.

In some implementations, sensor 18 can be communicably coupled to a processing system (not shown) configured to gather and analyze door operating metrics related to opening of display case door 12. The processing system can include instructions to perform data analytics and record door operating metrics about customer interaction with the display case each time the system receives a signal from sensor 18. These metrics can include, but are not limited to, the time at which display case door 12 is opened, the total number of times display case door 12 is opened in a given time period, or the frequency of openings of door 12 for a given time period. In some implementations, the processing system can also include instructions to trigger electronic advertising in response to receiving a signal from sensor 18.

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

The invention claimed is:

1. A system comprising:
   a display case door configured to be mounted to a display case;
   a camera mounted inside a cavity on the display case door and arranged to capture images of an interior of the display case, the camera oriented at an oblique angle relative to a surface of the display case door such that, when mounted to the display case, a field of view of the camera is aimed at the interior of the display case when the display case door is pivoted open by a distance that corresponds with the oblique angle;
   a sensor coupled to the display case door and in electronic communication with the camera, the sensor configured to signal the camera to capture one or more images of the interior the display case in response to detecting movement of the display case door; and
   an inventory management system communicably coupled to the camera, wherein the one or more images captured by the camera are processed by the inventory management system to determine one or more out-of stock items or a low stock items in the display case.

2. The system of claim 1, wherein the inventory management system is configured to transmit an electronic notification to a remote computing device in response to determining one or more out-of-stock items or low stock items in the display case.

3. The system of claim 2, wherein the electronic notification comprises information related to at least one of an identity of the out-of-stock items or low stock item, a quantity of the out-of-stock items or low stock item, or a location of the out-of-stock items or low stock item.

4. The system of claim 1, wherein the system is configured to trigger electronic advertising in response to receiving a signal from the sensor indicating movement of the display case door.

5. The system of claim 1, wherein the inventory management system is configured to process the one or more images captured by the camera using one or more object recognition algorithms.

6. The system of claim 1, wherein the camera is arranged to capture images of the interior of the display case through a transparent panel mounted to the display case door.

7. The system of claim 1, wherein the sensor comprises an accelerometer.

8. The system of claim 1, wherein the sensor is configured to signal the camera to capture one or more images of the interior of the display case upon detecting that the display case door is open by a threshold amount.

9. The system of claim 8, wherein signaling the camera to capture one or more images of the interior of the display case upon detecting that the display case door is open by a threshold amount ensures that at least a majority of the interior of the display case is within a field of view of the camera when the image is captured.

10. The system of claim 1, wherein signaling the camera to capture an image of the interior the display case comprises signaling the camera to capture multiple images.

11. The system of claim 1, wherein the sensor is configured such that it does not generate signals used to control operations of the camera when the display case door is in a closed position.

12. A computer-implemented door camera control method executed by one or more processors, the method comprising:
    obtaining, from a sensor mounted on a display case door, a signal indicating movement of the display case door;
    in response to receiving the signal, initiating a camera coupled to the display case door and triggering the camera to capture one or more images of an interior of a display case to which the display case door is mounted, wherein the camera is oriented at an oblique angle relative to a surface of the display case door such that a field of view of the camera is aimed at an interior of the display case when the display case door is pivoted by a distance that corresponds with the oblique angle; and
    processing the one or more images captured by the camera are to determine one or more out-of stock items or low stock items in the display case,
    wherein the camera arranged within a cavity on the display case door, and
    wherein the sensor is configured such that it does not generate signals used to control operations of the camera when the display case door is in a closed position.

13. The method of claim 12, further comprising, in response to determining one or more out-of-stock items or low stock items in the display case, transmitting an electronic notification to a remote computing device.

14. The method of claim 13, wherein the electronic notification comprises information related to at least one of an identity of the one or more out-of-stock items or low stock items, a quantity of the one or more out-of-stock items or low stock items, or a location of the one or more out-of-stock items or low stock items.

15. The method of claim 12, further comprising triggering electronic advertising in response to receiving a signal from the sensor indicating movement of the display case door.

16. The method of claim 12, wherein processing the one or more images captured by the camera comprises processing the one or more images using one or more object recognition algorithms.

17. A display case door camera control system comprising:
- a display case door configured to be mounted to a display case;
- a means for capturing image data, the means mounted inside a cavity on the display case door and arranged to capture image data of an interior of the display case through a transparent panel mounted to the display case door, the means being oriented at an oblique angle relative to a surface of the display case door such that, when mounted to the display case, a field of view of the means is aimed at the interior of the display case when the display case door is pivoted open by a distance that corresponds with the oblique angle; and
- a sensor coupled to the display case door and in electronic communication with the means for capturing image data, the sensor configured to signal the means to capture one or more images of the interior of the display case in response to detecting movement of the display case door.

18. The display case door camera control system of claim 17, further comprising an inventory management system that is configured to transmit an electronic notification to a remote computing device in response to determining one or more out-of-stock items or low stock items in the display case.

19. The display case door camera control system of claim 17, wherein the display case door camera control system is configured to trigger electronic advertising in response to receiving a signal from the sensor indicating movement of the door.

20. The display case door camera control system of claim 17, further comprising an inventory management system that is configured to process the one or more images captured by the camera using one or more object recognition algorithms.

* * * * *

UNITED STATES PATENT AND TRADEMARK OFFICE
CERTIFICATE OF CORRECTION

PATENT NO. : 12,303,045 B1
APPLICATION NO. : 18/354064
DATED : May 20, 2025
INVENTOR(S) : Matthew Rolek Page 1 of 1

It is certified that error appears in the above-identified patent and that said Letters Patent is hereby corrected as shown below:

In the Claims

Column 7, Line 61, Claim 1, delete "out-of stock" and insert -- out-of-stock --.

Column 8, Line 52, Claim 12, delete "out-of stock" and insert -- out-of-stock --.

Signed and Sealed this
Nineteenth Day of August, 2025

Coke Morgan Stewart
*Acting Director of the United States Patent and Trademark Office*